US 6,557,386 B2

(12) United States Patent
Donner et al.

(10) Patent No.: US 6,557,386 B2
(45) Date of Patent: May 6, 2003

(54) DEVICE FOR BLOCKING THE ABILITY OF A STEERING SHAFT OF A MOTOR VEHICLE TO ROTATE

(75) Inventors: Harald Donner, Meinerzhagen (DE); Werner Volmer, Iserlohn (DE); Jorg Welschholz, Herscheid (DE); Bernhard Schambeck, Munich (DE)

(73) Assignees: Leopold Kostal GmbH & Co. KG, Ludenscheid (DE); Bayerische Motoren Werke AG, Munich (DE)

( * ) Notice: Subject to any disclaimer, the term of this patent is extended or adjusted under 35 U.S.C. 154(b) by 0 days.

(21) Appl. No.: 09/804,858

(22) Filed: Mar. 13, 2001

(65) Prior Publication Data
US 2001/0027668 A1 Oct. 11, 2001

(30) Foreign Application Priority Data
Apr. 8, 2000 (DE) .......................... 100 17 591

(51) Int. Cl.⁷ .............................................. B60R 25/02
(52) U.S. Cl. ............................. 70/185; 70/186; 70/252
(58) Field of Search ..................... 70/1.5, 1.7, 182–186, 70/252

(56) References Cited

U.S. PATENT DOCUMENTS

| 1,363,373 | A | * | 12/1920 | Stabler | |
|---|---|---|---|---|---|
| 1,573,459 | A | * | 2/1926 | Stabler | |
| 1,956,438 | A | * | 4/1934 | Eichenauer | |
| 3,553,986 | A | * | 1/1971 | Ball et al ........................ | 70/252 |
| 3,596,483 | A | * | 8/1971 | Elliott ........................ | 70/186 |
| 3,651,329 | A | * | 3/1972 | Marlowe et al. .......... | 70/255 X |
| 4,596,303 | A | * | 6/1986 | Tremblay .................. | 70/252 X |
| 4,936,408 | A | * | 6/1990 | Melo ........................ | 70/252 X |
| 5,016,454 | A | * | 5/1991 | Al-Sheikh ..................... | 70/185 |
| 5,656,867 | A | * | 8/1997 | Kokubu ..................... | 70/252 X |
| 5,793,122 | A | | 8/1998 | Dingwall et al. .......... | 70/252 X |
| 6,260,651 | B1 | * | 7/2001 | Kokubu et al. ........... | 70/252 X |
| 6,324,878 | B1 | * | 12/2001 | Ramamurthy et al ......... | 70/186 |
| 6,354,118 | B1 | * | 3/2002 | Frick et al ..................... | 70/186 |

FOREIGN PATENT DOCUMENTS

| DE | 197 07 067 C1 | | 6/1998 |
|---|---|---|---|
| DE | 197 13 318 C1 | | 8/1998 |
| EP | 162986 | * | 12/1985 |
| EP | 0 967 129 A1 | | 12/1999 |
| FR | 2 699 476 A1 | | 6/1994 |

* cited by examiner

Primary Examiner—Lloyd A. Gall
(74) Attorney, Agent, or Firm—Brooks & Kushman, P.C..

(57) ABSTRACT

A device for blocking the turnability of the steering spindle 3 of a motor vehicle contains a movable interlocking element 14 that is situated in a lock chamber 12 and engages into the steering spindle 3 in its locked position, as well as an actuating device 9 for actuating the interlocking element 14. This device is characterized by the fact that the lock chamber 12 is passively secured against manipulative access by electric/electronic operating components K required for driving the motor vehicle. This is realized by arranging these operating components K in such a position relative to the lock chamber 12 that the function of at least one operating component K is terminated if manipulative access is attempted.

5 Claims, 2 Drawing Sheets

DEVICE FOR BLOCKING THE ABILITY OF A STEERING SHAFT OF A MOTOR VEHICLE TO ROTATE

TECHNICAL FIELD

The invention pertains to a device for blocking the turnability of the steering spindle of a motor vehicle—a steering spindle locking device—which contains a movable interlocking element situated in a lock chamber and engages into the steering spindle in its locked position as well as an actuating device for actuating the interlocking element.

BACKGROUND ART

A steering spindle locking device represents an anti-theft unit that is accommodated in a lock chamber formed by a lock body in order to protect the motor vehicle from authorized use. Such a steering spindle locking device consists of an interlocking element that engages into an interlocking element receptacle arranged in the steering spindle in its locked position so as to block the turnability of the steering spindle. A bar that can be displaced radially with reference to the rotational axis of the steering spindle and that is realized in similar fashion to a locking bolt is usually utilized as the interlocking element. An actuating device is also assigned to the steering spindle locking device, with said actuating device actuating the interlocking bolt such that it can be displaced from a position in which it is interlocked with the steering spindle to a position in which the steering spindle can be turned. The actuating device may be realized in a mechanical fashion as is the case in conventional steering spindle locking devices, with the steering spindle being unlocked in this case by turning the ignition key in the cylinder of the lock. In this type of mechanical coupling between the rotational axis of the ignition key and the displacement of the interlocking bolt the longitudinal axis of the interlocking bolt is either arranged perpendicular or parallel with reference to the rotational axis of the ignition key. This results in an inclined or angled arrangement of the interlocking bolt with reference to the longitudinal axis of the steering spindle.

The lock body that encloses the interlocking element is realized in a stable fashion and acts as a mechanical barrier to prevent or impair direct access to the interlocking element. The lock body consists of an annular cylindrical body of metal that is manufactured by means of casting because of its complicated shape, and it directly accommodates the interlocking element or its guide, respectively. The lock body is realized in one piece in order to make removal of the steering spindle locking device more difficult, i.e., manipulative access to the interlocking element is not simplified by the weakened zone that would be created by connecting several lock body parts in order to realize the lock body. The lock body manufactured by means of zinc diecasting is, however, unable to withstand a refrigerant, for example, a refrigerant in the form of a spray. In the deep-frozen state, the lock body can be easily destroyed such that the interlocking element is accessible and the motor vehicle can be rendered steerable in such cases. This means that an unauthorized user is also able to drive away in the motor vehicle.

In order to make such a manipulation of the steering spindle locking device more difficult, it was attempted to utilize lock bodies that have an excessive thickness in order to protect the steering spindle locking device or the interlocking element with its guide, respectively. However, this not only makes manufacture of the lock body more complicated, but the lock body also has increased weight and requires a larger installation space. This is, however, undesirable.

Another device for securing a steering spindle locking device is known from U.S. Pat. No. 5,793,122 A. The object of this document consists of a security unit for protecting the steering wheel lock of a motor vehicle. This is realized in the object of U.S. Pat. No. 5,793,122 A by providing active electric/electronic security devices, e.g., switches, wires or the like. When a wire is destroyed or a switch is triggered, a certain security action is carried out. The security system described in this document is realized by utilizing a conventional security system, e.g., such as is used in shop windows into which alarm wires are embedded. If a wire embedded in such a window is destroyed, the alarm is correspondingly triggered. However, utilization of this quite old security concept for protecting a steering wheel lock of a motor vehicle requires that additional components, namely the security components, need to be accommodated in the already limited installation space of such a steering wheel lock. Consequently, a correspondingly large installation space needs to be available for these components. This is not always the case, however.

In such known security devices, in which the steering wheel lock is, in particular, secured with wires, one has to accept the additional risk that the electromagnetic radiation emitted by such wires may interfere with the other electric components arranged in the vicinity of the steering wheel lock. Consequently, it is relatively difficult to actually utilize a security device according to U.S. Pat. No. 5,793,122 A.

SUMMARY OF THE INVENTION

Based on this state of the art, the invention aims to additionally develop a motor vehicle in such a way that superior protection of the steering spindle locking device is ensured without requiring a larger installation space, and in particular, such that the proper function of existing electronic components is not impaired.

According to the invention, this objective is attained due to the fact that the lock chamber is passively protected from manipulative access by electric/electronic operating components required for driving the motor vehicle. This is realized by arranging these operating components in such a position relative to the lock chamber that the function of at least one such operating component is terminated if manipulative access is attempted.

In contrast to the object of U.S. Pat. No. 5,793,122 A, no additional components are used in the device according to the invention for blocking the turnability of the steering spindle of a motor vehicle. The lock chamber is instead passively protected by means of the skillful arrangement of electric/electronic operating components that are provided in any case. In this respect, the invention proposes that the electric/electronic operating components that are in any case situated in the vicinity of the lock chamber on the steering spindle, namely operating components required for driving the motor vehicle, are arranged relative to the lock chamber in such a way that access is at least blocked in the directions from which manipulative access can be expected. If one attempts to gain manipulative access to the lock chamber, at least one of the electric/electronic operating components is destroyed before the steering spindle locking device becomes accessible. The motor vehicle is, however, no longer drivable after destruction of such an operating component. This type of protection is, consequently, referred to as passive protection, in which, in particular, no larger installation space is required due to the lack of additional components. In addition, the electric/electronic operating components arranged in the vicinity of the steering spindle are not subjected to undesirable interference.

In this steering spindle locking device, manipulative access to the lock chamber leads to destruction of at least one of the electric/electronic components used, such that the motor vehicle can subsequently no longer be started and driven. In known lock bodies, targeted manipulation of the lock body could easily result in disengagement of the interlocking element and thus make it possible to turn the steering spindle. This is practically impossible, however, with the object of the present invention due to the possible tight arrangement of the electric/electronic components. The interlocking element may, for example, be surrounded by electric conductors, with the severing of only one conductor making it impossible to start the motor vehicle. It is particularly practical to secure the interlocking element with electric/electronic components that are not only relevant, but also absolutely imperative for driving the motor vehicle. In addition, it is practical to utilize electric/electronic components that are usually situated in the vicinity of the steering spindle locking device in any case, e.g., the electric/electronic components of the individual modules of a steering column module.

Securing the interlocking element or the entire lock chamber, respectively, with the described electric/electronic components makes it possible to realize a mechanical barrier, e.g., the massive lock body described previously with reference to the relevant state of the art, that is much weaker. Nevertheless, the effectiveness of such an electric/electronic barrier against manipulative access is increased.

The actuating device can be arranged in the lock chamber together with the steering spindle locking device or also protected by corresponding measures.

Various electric/electronic operating components for protecting the interlocking element may be arranged in the lock chamber. For example, electric plug connectors can be arranged in the lock chamber in such a way that one or more plug connector(s) is/are destroyed if attempts are made to manipulate a housing shell that delimits the lock chamber. This would terminate functions that are relevant or required for driving the motor vehicle. According to another embodiment, it is proposed that the electric/electronic operating components be arranged on one or more printed circuit board(s), e.g., flexible printed circuit boards. The printed circuit board(s) is/are arranged as a protective shield for the interlocking element situated in the lock chamber or for the actuating device, at least within the regions where manipulations can be expected. These electric/electronic components may consist of components that are provided solely to protect the interlocking element in the lock chamber or, if the steering spindle locking device forms part of a steering column module, of components that form part of the modules that are combined into the steering column module.

In another embodiment, the lock chamber is delimited by a lower carrying shell and an upper shell, with the upper shell representing the carrier for a printed circuit board that contains the electric/electronic components. Extensions that project from the lower carrying shell and extend across the lock chamber are provided in this case, with said extensions extending into the area of the electric/electronic operating components on the printed circuit board. If the lower carrying shell is deformed, e.g., due to attempted manipulation by means of a refrigerant and a hammer, the extensions act as spikes that penetrate into and destroy the electric/electronic operating components during such a manipulation.

Utilization of such a steering spindle locking device is particularly practical if it forms part of a steering column module. In this case, the lock chamber of this steering column module is delimited by a lower carrying shell that simultaneously serves to connect the steering column module to the outer tube of the steering column. The upper side of the lock chamber is also delimited by a shell that is, for example, supported on the lower carrying shell by means of mounting legs. The upper shell serves as a carrier for the modules of the steering column module. An outer wall that is either integrally formed onto the lower carrying shell, the upper shell or partially on both shells delimits the lock chamber in the radial direction. Due to this measure, a lock chamber is formed which encloses and annularly extends around the steering spindle. This entire space can now be utilized to accommodate a steering spindle locking device. In this respect, it is particularly practical to space the steering spindle locking device apart from the lower carrying shell. The steering spindle locking device can be supported on the lower carrying shell by a suitable fastening means. A steering spindle locking device can be arranged almost arbitrarily in this lock chamber.

Due to its essentially flat shape, the carrying shell can be manufactured from a metal sheet, in particular, a metal sheet with particular hardness and sufficient toughness. Manufacturing can be realized in the form of a cold forming process. Due to the choice of material, resistance of such a metal sheet to manipulation of the steering spindle locking device is much higher than is that of known lock bodies. The use of these materials in known lock bodies is not possible because they cannot be cast. Consequently, it is possible to utilize a material for such a carrying shell which, in contrast to the known state of the art, is not cast, but is instead manufactured inexpensively by means of cold forming, e.g., deep-drawing.

The upper shell that delimits the upper side of the lock chamber also serves to prevent or counteract manipulative access to the lock chamber. In addition, the upper shell that is supported on the lower carrying shell also serves to accommodate at least one other module, e.g., a steering column switch. The upper shell may also be used as a carrier for modules that are arranged above one another in several planes.

BRIEF DESCRIPTION OF THE DRAWINGS

Additional advantages and practical variations of the invention are disclosed in the following description of two embodiments, with reference to the enclosed figures. The figures show.

DETAILED DESCRIPTION OF THE PREFERRED EMBODIMENT(S)

Figure 1:
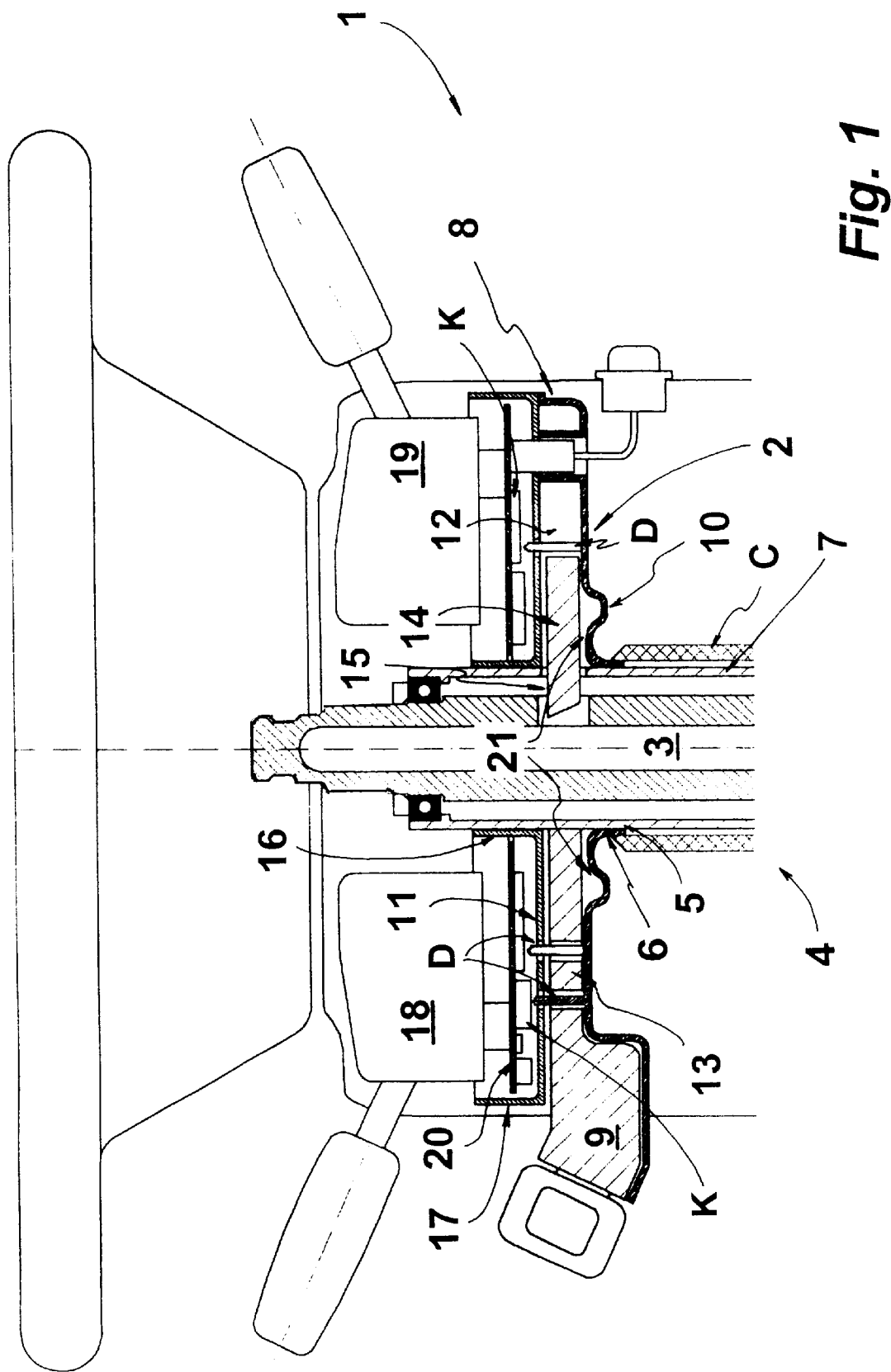
FIG. 1, a schematic longitudinal section through a steering column module with a steering spindle locking device according to a first embodiment, and FIG. 2, a schematic longitudinal section through a steering column module with a steering spindle locking device according to a second embodiment.

A steering column module 1 consists of a lower carrying shell 2 that surrounds the steering spindle 3 of a steering column 4 in an approximately concentric fashion. The carrying shell 2 has a central opening 5, through which the steering spindle 3 extends. The opening 5 is formed by an outwardly flanged mounting edge 6 that is fixed to the outer tube 7 of the steering column 4. The lower carrying shell 2 is manufactured from a metal sheet with particular hardness and high toughness such that it is particularly resistant to mechanical and thermal manipulations.

The lower carrying shell 2 contains a circumferential outer wall 8 that is interrupted only by the lock cylinder 9. An annular bead 10 that extends concentrically to the opening 5 serves to additionally reinforce the lower carrying shell 2.

The annular receptacle formed by the mounting edge 6 and the bead 10 serves to deflect a crash element C that surrounds the outer tube 7. An upper shell 11 that also consists of a hard and preferably tough metal is supported on the lower carrying shell 2 by means of mounting bolts that are not shown in this figure. A lock chamber 12 is formed by the lower carrying shell 2, the outer wall 8 and the upper shell 11, with a device 13 for locking the steering spindle being arranged in this lock chamber. The steering spindle locking device 13 has a flat design and contains an interlocking element 14 that extends annularly around the steering spindle 3. In this steering spindle locking device 13, actual locking of the steering spindle 3 is realized with an interlocking pin 15 arranged on the side of the steering spindle 3 situated diametrically opposite to the lock cylinder 9.

The upper shell 11 contains an inner and an outer circumferential edge 16 and 17, with said circumferential edges forming an installation space that serves for insertion and mounting of modules. In the embodiment shown, two steering column switches 18, 19 are arranged in one module plane. The steering column switches 18, 19 are mounted on the upper shell 11 and contact a printed circuit board 20. The outer circumferential edge 17, in particular, also serves as an additional measure for securing the lock chamber against mechanical manipulation in the radial direction.

Due to the material used, in particular for the lower carrying shell 2, access to the lock chamber 12 by means of mechanical manipulation, e.g., destruction of the lower carrying shell 2, is much more difficult by comparison to known lock bodies. The air cushion 21 situated between the lower carrying shell 2 and the interlocking element 14 is, in particular, important with respect to manipulation by means of a refrigerant. In this respect, transmission of the refrigeration effect from the lower carrying shell 2 to the interlocking element 14 or its pin 15 requires several transfer points.

Spikes D in the form of extensions are integrally formed onto the carrying shell 2 such that they extend across the lock chamber 12. These spikes also extend through the upper shell 11. The spikes D extend into the vicinity of electronic operating components K that are situated on the printed circuit board 20 and are required for operation of the motor vehicle. Destruction of at least one of these operating components makes it impossible to operate the motor vehicle. If attempts are made to manipulate the lower carrying shell 2, e.g., with a hammer, the spikes D are moved toward and driven into the electronic operating components K. Consequently, the operating components are destroyed. Since these electronic components consist of components required for driving the motor vehicle, the vehicle can no longer be driven after one of the components K has been destroyed.

Figure 2:
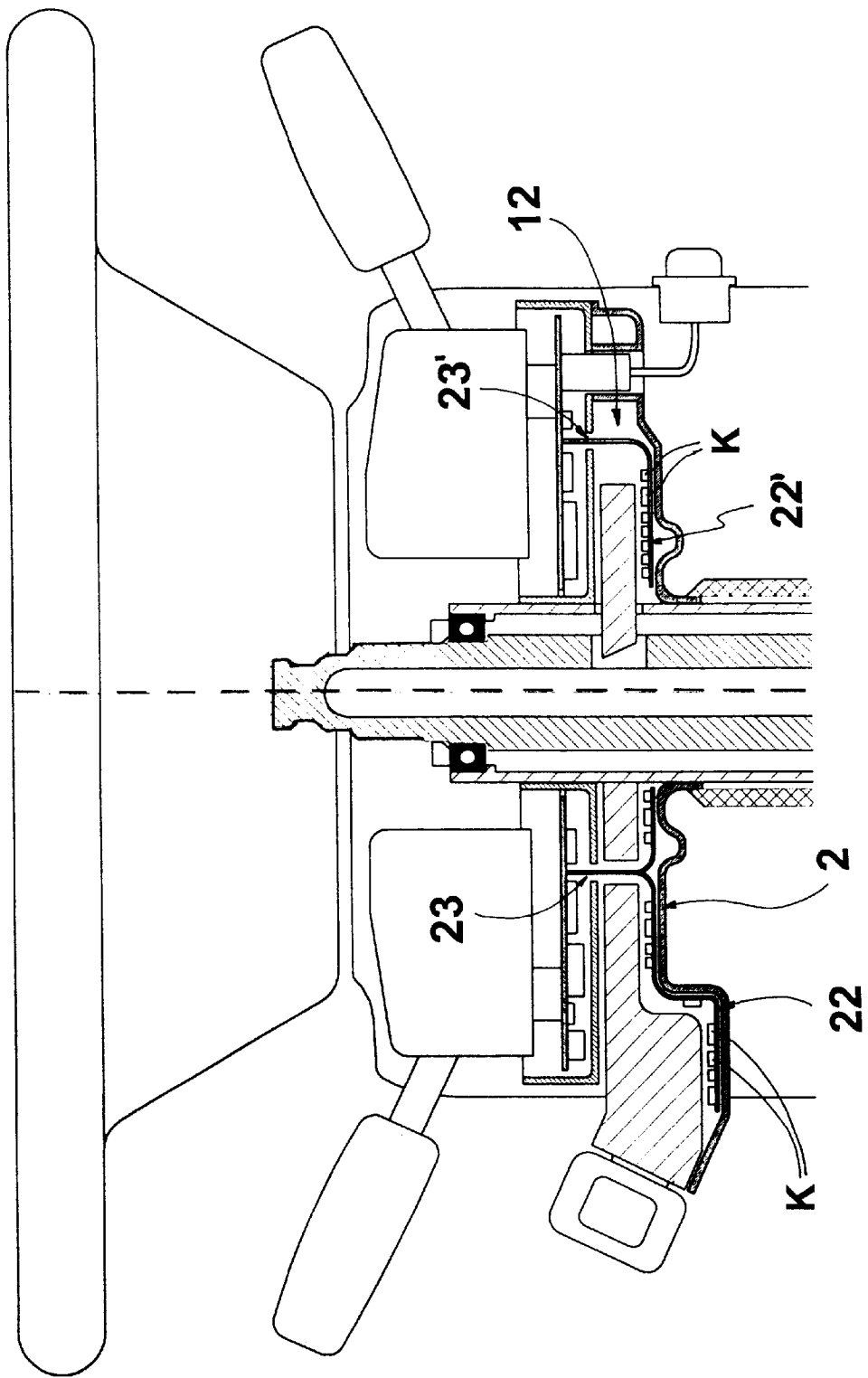

FIG. 2 shows another embodiment of the invention which, in principle, is designed in analogous fashion to the embodiment according to FIG. 1, i.e., identical components are identified by the same reference symbols. By contrast to the embodiment according to FIG. 1, electronic operating components K are arranged above the lower carrying shell 2 on flexible printed circuit boards 22, 22' in order to secure the steering spindle locking device 13. These electronic components K are connected to one another via corresponding strip conductors. The flexible printed circuit boards 22, 22' are connected to corresponding connections on the printed circuit board 20 via connecting lugs 23, 23'. During an attempt to gain manipulative access to the lock chamber 12 from the underside of the steering column module 1, the electronic components K or the strip conductors that serve to connect the electronic components are destroyed such that the motor vehicle is no longer drivable. These electronic components K also consist of components that are required for driving the motor vehicle. During an attempted thermal manipulation of the steering spindle locking device 13 from the side of the lower carrying shell 2, the electronic operating components K are inevitably destroyed such that the motor vehicle can no longer be driven.

The description of the invention makes it clear that the claimed enclosure of the interlocking element or the entire steering spindle locking device by means of relevant or required electric/electronic components represents an effective anti-theft measure for motor vehicles. This anti-theft measure can also be improved by providing a lock chamber that is additionally protected in a mechanical fashion, as in the embodiments illustrated in the figures.

LIST OF REFERENCE SYMBOLS

1 Steering column module
2 Carrying shell
3 Steering spindle
4 Steering column
5 Opening
6 Mounting edge
7 Outer tube
8 Outer wall
9 Lock cylinder
10 Bead
11 Upper shell
12 Lock chamber
13 Steering spindle locking device
14 Interlocking element
15 Interlocking pin
16 Inner edge
17 Outer edge
18 Steering column switch
19 Steering column switch
20 Printed circuit board
21 Air cushion
22, 22' Flexible printed circuit board
23, 23' Connecting lugs
C Crash element
D Spike
K Electronic operating components

What is claimed is:

1. A locking device for a steering spindle of a motor vehicle, the device comprising:
    a lock chamber;
    a movable interlocking element situated in the lock chamber, the interlocking element being movable to engage the steering spindle in order to lock the steering spindle;
    an actuating device for actuating the interlocking element; and
    an electronic operating component operable to provide a required function for driving the motor vehicle, wherein the electronic operating component is arranged in a position relative to the lock chamber such that the electronic operating component is rendered inoperative during manipulative access to the lock chamber, thereby disabling the motor vehicle;

wherein the electronic operating component includes a printed circuit board arranged adjacent to the interlocking element to form a protective shield where manipulative access to the lock chamber is expected;

wherein the lock chamber is delimited by a lower shell and an upper shell, the upper shell carrying the printed circuit board, the lower shell having extensions that project across the lock chamber into the printed circuit board, wherein the extensions penetrate into the printed circuit board to destroy the printed circuit board as the lower shell is deformed during manipulative access to the lock chamber thereby disabling the motor vehicle.

2. The device of claim 1 wherein:

the electronic operating component includes electronic operating components operable to provide required functions for driving the motor vehicle.

3. The device of claim 1 wherein:

the electronic operating component is part of an electronic module of a steering column of the steering spindle.

4. The device of claim 1 wherein:

the lower shell is a metal formed by a cold forming process.

5. The device of claim 1 wherein:

the interlocking element is spaced apart from the lower shell such that an air cushion remains in between.

* * * * *